United States Patent
Yoon

(10) Patent No.: US 9,252,447 B2
(45) Date of Patent: Feb. 2, 2016

(54) COMPOSITE ANODE FOR A SOLID OXIDE FUEL CELL WITH IMPROVED MECHANICAL INTEGRITY AND INCREASED EFFICIENCY

(75) Inventor: Hee Sung Yoon, College Park, MD (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 13/593,155

(22) Filed: Aug. 23, 2012

(65) Prior Publication Data

US 2013/0052562 A1 Feb. 28, 2013

Related U.S. Application Data

(60) Provisional application No. 61/527,375, filed on Aug. 25, 2011.

(51) Int. Cl.
*H01M 4/90* (2006.01)
*H01M 8/12* (2006.01)
*H01M 4/86* (2006.01)

(52) U.S. Cl.
CPC ............ *H01M 8/126* (2013.01); *H01M 4/8657* (2013.01); *H01M 4/9066* (2013.01); *Y02E 60/521* (2013.01); *Y02E 60/525* (2013.01)

(58) Field of Classification Search
CPC . H01M 4/8657; H01M 4/9066; H01M 8/126; Y02E 60/521; Y02E 60/525
See application file for complete search history.

(56) References Cited

U.S. PATENT DOCUMENTS

2008/0131752 A1* 6/2008 Hwang ........................... 429/34

2008/0166618 A1* 7/2008 Larsen et al. .................. 429/33
2011/0003235 A1* 1/2011 Hwang et al. ................ 429/495

FOREIGN PATENT DOCUMENTS

| EP | 1939967 A1 | 7/2008 |
| EP | 2669984 A2 | 12/2013 |
| JP | 2008098069 A * | 4/2008 |
| WO | WO 2010/045329 A2 | 4/2010 |

OTHER PUBLICATIONS

Siddharth Patel, Perfomance of Ni/CeO2/YSZ SOFC Anodes with Carbonaceous Fuels—2009, pp. 11, 25, 89, 90.*
Lee, K.T. et al. "Effect of AFL Composition on IT-SOFC Electrochemical Performance and Quantitative Microstructural Analysis Using FIB/SEM", Apr. 2010, The Electrochemical Society, 217th ECS Meeting Abstracts, Abstract #713.*
Liu, Q.L. et al. "Anode-supported solid oxide fuel cell with yttria-stabilized zirconia/gadolinia-doped ceria bilayer electrolyte prepared by wet ceramic co-sintering process", Oct. 2, 2006, Journal of Power Sources (162), pp. 1036-1042.*

(Continued)

*Primary Examiner* — Carlos Barcena
*Assistant Examiner* — Lilia V Nedialkova
(74) *Attorney, Agent, or Firm* — Saliwanchik, Lloyd & Eisenschenk

(57) ABSTRACT

A composite anode for a solid oxide fuel cell (SOFC), comprising an anode support layer (ASL) of Ni—YSZ and an anode functional layer (AFL) of Ni—GDC, displays enhanced mechanical stability and similar or improved electrical efficiency to that of a Ni—GDC ASL for otherwise identical SOFCs. A SOFC employing the composite anode can be used for power generation at temperatures below 700° C., where the composite anode may include a second AFL of GDC disposed between the Ni—GDC layer and a GDC electrolyte.

5 Claims, 2 Drawing Sheets

(56) References Cited

OTHER PUBLICATIONS

Badwal, S.P.S. et al. "Investigation of the stability of ceria-gadolinia electrolytes in solid oxide fuel cell environments", 1999, Solid State Ionics (121), pp. 253-262.*

Zhao F. and Virkar Anil V., "Dependence of polarization in anode-supported solid oxide fuel cells on various cell parameters", 2004, Journal of Power Sources (141), pp. 79-95.*

Gross M., et al. "Recent Progress in SOFC Anodes for Direct Utilization of Hydrocarbons", 2007, Journal of Materials Chemistry (17), pp. 3071-3077.*

Ahn, et al. "Performance of IT-SOFC with $Ce_{0.9}Gd_{0.1}O_{1.95}$ Functional Layer at the Interface of $Ce_{0.9}Gd_{0.1}O_{1.95}$ Electrolyte and Ni—CeGdO Anode", 2008, ECS Transactions (11), pp. 99-106.*

Machine translation of Japanese Patent Publication JP 2008-098069 A.*

Zhu, W.Z., Deevi, S.C., "A Review on the Status of Anode Materials for Solid Oxide Fuel Cells", Materials Science and Engineering A, vol. 362, pp. 228-239, Sep. 4, 2003.*

Leonide, A. "SOFC Modelling and Parameter Identification by Means of Impedance Spectroscopy", KIP Scientific Publishing, Aug. 13, 2010.*

Fiuza, R.P. et al., "XRD and TPR Characterization of Fe—Ni/YSZ-GDC for Application as SOFC Anode," $11^{th}$ International Conference on Advanced Materials, Sep. 20-25, 2009, Abstract only, Rio de Janeiro, Brazil.

Jiang, S.P. et al., "Performance of GDC-Impregnated Ni Anodes of SOFCs," Electrochemical and Solid-State Letters, 2004, pp. A282-A285, vol. 7, No. 9.

Qiao, J. et al., "Performance of mix-impregnanted $CeO_2$—Ni/YSZ Anodes for Direct Oxidation of Methane in Solid Oxide Fuel Cells," Fuel Cells, 2009, pp. 729-739, vol. 9, No. 5.

Xia, C. et al., "A Simple and Cost-Effective Approach to Fabrication of Dense Ceramic Membranes on Porous Substrates," J. Am. Ceram. Soc., 2001, pp. 1903-1905, vol. 84, No. 8.

Bishop, S.R. et al., "Chemical Expansion: Implications for Electrochmical Energy Storage and Conversion Devices," Annu. Rev. Mater. Res., 2014, pp. 205-239, vol. 44.

Ding, D. et al., "Electrical properties of samaria-doped ceria electrolytes from highly active powders," Electrochimica Acta, 2010, pp. 4529-4535, vol. 55.

Hui, R. et al., "Thermal plasma spraying for SOFCs: Applications, potential advantages, and challenges," Journal of Power Sources, 2007, pp. 308-323, vol. 170.

Hwang, C. et al., "Formation of nanostructured YSZ/Ni anode with pore channels by plasma spraying," Surface & Coatings Technology, 2007, pp. 5954-5959, vol. 201.

Lee, K.T. et al., "Comprehensive quanitifcation of Ni—$Gd_{0.1}Ce_{0.9}O_{1-95}$ anode fuctional layer microstructures by three-dimensional reconstruction using a FIB/SEM dual beam system," Journal of Power Sources, 2013, pp. 220-228, vol. 228.

Nakajo, A. et al., "Mechanical reliability and durability of SOFC stacks. Part I: Modeling of the effect of operating conditions and design alternatives on the reliability," International Journal of Hydrogen Energy, 2012, p. 9249-9268, vol. 37.

Song, J-H. et al., "The Effect of Fabrication Conditions for GDC Buffer Layer on Electrochemical Performance of Solid Oxide Fuel Cells," Nano-Micro Letters, 2013, pp. 151-158, vol. 5, No. 3.

Teocoli, F. et al., "Effects of co-sintering in self-standing CGO/YSZ and CGO/ScYSZ dense bi-layers," J Mater Sci, 2014, pp. 5324-5333, vol. 49.

Yang, Y-C., et al., "Residual stresses in the atmospheric plasma sprayed NiO/LDC anode of the metallic supported solid oxide fuel cells," Surface & Coatings Technology, 2013, pp. 193-200, vol. 231.

* cited by examiner

US 9,252,447 B2

COMPOSITE ANODE FOR A SOLID OXIDE FUEL CELL WITH IMPROVED MECHANICAL INTEGRITY AND INCREASED EFFICIENCY

CROSS-REFERENCE TO RELATED APPLICATION

The present application claims the benefit of U.S. Provisional Application Ser. No. 61/527,375, filed Aug. 25, 2011, which is hereby incorporated by reference herein in its entirety, including any figures, tables, or drawings.

BACKGROUND OF INVENTION

Fuel cells combine oxygen and fuel to chemically generate electricity without combustion. Fuel cells are simple devices that contain no moving parts, consisting essentially of four functional elements: cathodes, electrolytes, anodes and interconnects. Solid oxide fuel cell (SOFC) technology has the distinct advantage over competing fuel cell technologies (e.g. molten carbonate, polymer electrolyte, phosphoric acid and alkali) because of an ability to use fuels other than hydrogen (such as methane, butane or even gasoline and diesel) and a relative insensitivity to CO that can act as a fuel for these cells, but acts as a poison to other fuel cell types. The general design of a SOFC is two porous electrodes separated by a ceramic electrolyte. The oxygen source, typically air, contacts the cathode, for example a lanthanum manganite doped strontium (LSM) or other conventional cathode material, to form oxygen ions upon reduction by electrons at the cathodes metal/metal oxide/oxygen triple phase boundary. The oxygen ions diffuse through the electrolyte material, which is typically a ceramic material that can function as an excellent conductor of oxygen ions at the temperatures at which the cells is used. The oxygen ions encounter the fuel at the anode forming, water, carbon dioxide (with hydrocarbon fuels), heat, and electrons, which are transported from the anode through interconnects to an external circuit and ultimately back to the cathode.

Although SOFCs are, in concept, simple, the identification of efficient materials for the components and design of effective components remain an enormous challenge. The materials not only require the necessary electrical properties, but must be chemically and structurally stable. State of the art SOFCs operate at temperatures of about 1000° C. to achieve sufficiently high current densities and power. The reactivity of the components, with each other and/or the oxygen and/or the fuel, and the inter-diffusion between components presents a challenge at the high temperatures. The thermal expansion coefficients of the materials must be sufficiently matched to minimize thermal stresses that can lead to cracking and mechanical failure. The air side of the cell must operate in an oxidizing atmosphere and the fuel side must operate in a reducing atmosphere.

One of the more common electrolyte materials for fuel cells is yttria-stabilized zirconia (YSZ) which provides stabilized zirconia in the cubic structure at low temperatures and provides oxygen vacancies. Alternative to YSZ for low temperature cells, below 800° C., are doped cerium oxides and doped bismuth oxides. Although these materials have shown promise, neither is particularly robust mechanically in the reducing atmosphere at the anode. Bismuth oxide-based electrolytes have high oxygen ion conductivities that are sufficient for low temperature operations, but require high $P_{O2}$ levels for sufficient thermodynamic stability. Low $P_{O2}$ at the anode promotes bismuth oxide decomposition, which can result in failure of the SOFC. Cerium oxide based electrolytes have the advantage of high ionic conductivity in air and can operate effectively at low temperatures (under 700° C.). However, these electrolytes are susceptible to reduction of $Ce^{+4}$ to $Ce^{+3}$ on the anode, leading to electronic conductivity and a leakage current between the anode and cathode.

In addition to the need for a superior electrolyte, improvements to the anode and cathode are desirable. A significant improvement to an anode for SOFCs is disclosed in Wachsman et al. PCT Application Publication No. WO/2010/045329, which is incorporated herein by reference. However, although Wachsman et al. teaches the use of an anode functional layer (AFL) that improves the triple phase boundary between the anode, electrolyte, and fuel, the anode has limits to the range of useful operating conditions due to requirements for mechanical stability. Hence, an anode that permits the improved performance disclosed in Wachsman et al., but with even greater mechanical stability is a desirable goal.

BRIEF SUMMARY

Embodiments of the invention are directed to a composite anode comprising an anode support layer (ASL) comprising nickel-yttria-stabilized zirconia (Ni—YSZ) and an anode functional layer (AFL) comprising nickel-gadolinium-doped ceria Ni—GDC. In one embodiment of the invention, the Ni—GDC AFL can be 5 to 40 μm in thickness and can be placed on an ASL of 250 to 500 μm in thickness. In an embodiment of the invention, a second AFL comprising gadolinium-doped ceria (GDC), can be formed on the Ni—GDC AFL surface opposing the ASL. The composite anode is useful as a component of a solid oxide fuel cell (SOFC), according to an embodiment of the invention. The SOFC comprises an electrolyte layer of GDC that is situated on the ultimate AFL, distal to the ASL of the composite anode.

DETAILED DISCLOSURE

Embodiments of the invention are directed to composite anodes, for SOFC applications where the mechanical stability is enhanced without sacrifice of cell performance, and to SOFCs comprising the improved anode. In an embodiment of the invention, a composite anode comprises an anode support layer (ASL) comprising nickel-yttria-stabilized zirconia (Ni—YSZ) with an anode functional layer (AFL) comprising nickel-gadolinium-doped ceria (Ni—GDC); where in a SOFC, according to an embodiment of the invention, the AFL resides between and contacts the ASL of the anode to an electrolyte layer comprising GDC. Additionally, a second AFL comprising GDC can be formed on the Ni—GDC AFL to better couple the Ni—GDC AFL to the GDC electrolyte. The composite anode is mechanically stable in the reducing atmosphere of the fuel, as the solid electrolyte exposed to the fuel is the Ni—YSZ ASL, while the Ni—GDC AFL provides a superior triple interface between the fuel, anode and electrolyte for superior performance in SOFCs, including SOFCs that are used at relatively low temperatures, <700° C. Other embodiments of the invention are directed to a method of preparing the composite anode having a Ni—YSZ ASL and a Ni—GDC AFL.

The ASL is a Ni—YSZ layer of about 250 to 500 μm in thickness and the Ni—GDC AFL is about 5 to about 30 μm in thickness. A well contacted interface is achieved with good ion and electrical conductivity. A solution of gadolinium nitrate, cerium nitrate and, optionally, nickel nitrate can be infused into a partially sintered anode to increase the density. The GDC electrolyte layer of a SOFC resides on the Ni—GDC AFL, in intimate contact with the AFL. The composite anode and the SOFC can be formed by any method where the layers can have intimate contact.

In an embodiment, NiO—YSZ can be caste and partially sintered to form a tape of any desired shape, for example a flat plate or a cylinder. A NiO—GDC slurry can be coated upon the NiO—YSZ tape by any method appropriate for the shape of the tape, for example, spin coating on a NiO—YSZ tape in the form of a flat plate. The loading of the slurry, the size of the particles in the slurry, and the quantity of slurry deposited are controlled to achieve a desired AFL layer density and thickness. A second partial sintering can be carried out to fix the Ni—GDC layer on the NiO—YSZ tape. This partially sintered anode precursor can be infiltrated from the NiO—GDC exposed surface with a mixture of a nitrate solution (gadolinium, cerium, and, optionally, nickel), where after drying, a GDC slurry can be coated onto the top structure to form an electrolyte layer for the SOFC. Subsequently, the Ni—YSZ/Ni—GDC composite anode and electrolyte can be fully sintered to achieve a dense electrolyte and anode structure.

Figure 1:
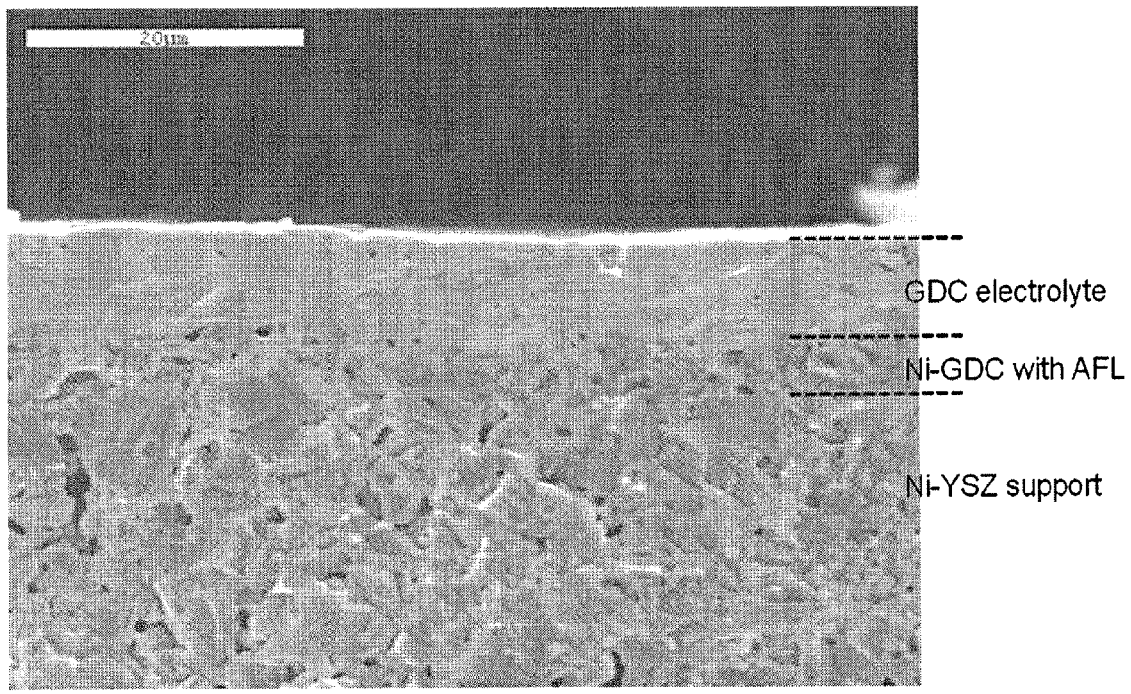
FIG. 1 is a SEM image of an exemplary composite anode, according to an embodiment of the invention, and electrolyte layer disposed on the AFL of the composite anode for use in a SOFC, according to an embodiment of the invention.

In another embodiment, two matching tapes of NiO—YSZ and NiO—GDC are formed, with the NiO—GDC tape being 5 to 40 μm in thickness. The two tapes are laminated together by calendaring and/or pressing, using a roller and/or a heated platen under pressure, and heating, followed by partial sintering the laminated layers. A GDC slurry is deposited, on the surface of the NiO—GDC layer of the layered composite sintered layers, to form a thin uniform electrolyte layer, to achieve a dense electrolyte layer on the Ni—GDC layer of the composite anode upon full sintering. Additionally, a solution of gadolinium nitrate and cerium nitrate can be infiltrated into the partially sintered bonded layers, before or after deposition of the GDC slurry, while on a heated platen, to drive the nitrate solution into the structure and partially sinter the infused bonded layers. FIG. 1 shows a SEM image of an exemplary NiO—YSZ/NiO—GDC composite anode with a GDC electrolyte disposed on the surface of the AFL.

In another embodiment, three matching tapes of NiO—YSZ, NiO—GDC, and GDC are formed, where the NiO—GDC and GDC tapes are 30 μm or less in thickness. The three tapes are laminated together by calendaring, pressing using a roller, and/or a heated platen under pressure and heat, followed by partial sintering the laminated layers. The partially sintered bonded layers are infiltrated with a solution of gadolinium nitrate and cerium nitrate on a heated platen, followed by fully sintering the combined composite anode electrolyte structure.

According to an embodiment of the invention, a SOFC comprises the composite anode with a GDC electrolyte, a cathode, and the necessary interconnects. The GDC electrolyte can be a portion of a bilayer electrolyte. Bilayer electrolytes, cathodes, and other components of SOFCs, useful for relatively low temperature SOFCs, are disclosed in Wachsman et al. PCT Application Publication No. WO/2010/045329, which is incorporated herein by reference.

METHODS AND MATERIALS

NiO—GDC ASL

NiO—GDC ASLs were prepared by tape casting a mixture of NiO and $Ce_{0.9}Gd_{0.1}O_{1.95}$ powder. NiO (CAS 1313, Alfa Aesar) and GDC (LOT H-050708, Rhodia) powders in a ratio of 65:35 wt % were ball milled using Menhaden Fish Oil as a dispersant in a mixed Toluene/Ethyl alcohol solvent system for 24 hours to form a suspension. A mixture of butyl benzyl phthalate (BBP), polyethylene glycol (PEG) plasticizer, and polyvinyl butyral (PVB) binder were added to the suspension and ball milled for another 24 hours to form a slurry. The slurry was transferred to a vacuum chamber and de-gassed. The slurry was tape-cast using Procast (DHI, Inc.). The resulting NiO—GDC tape was dried for 2 hours at 100° C., after which 32 mm diameter circular green tapes were punched out. The circular anode tapes were partially sintered at 900° C. for 2 hours.

NiO—YSZ ASL/Ni)-GDC AFL

NiO—YSZ ASLs were prepared by tape casting a mixture of NiO and 3 to 8 mol % yttria stabilized zirconia powder. NiO (CAS 1313, Alfa Aesar) and YSZ (3YSZ or 8YSZ, Tosoh) powders were combined at a 65:35 wt % ratio The mixture was ball milled with Menhaden Fish Oil as a dispersant in a mixed Toluene/Ethyl alcohol solvent system for 24 hours to form a suspension. A mixture of butyl benzyl phthalate (BBP), polyethylene glycol (PEG) plasticizer, and polyvinyl butyral (PVB) binder were added to the suspension and ball milled for another 24 hours.

A mixture of NiO and GDC powders (65:35 wt % ratio) was ball milled for 24 hours with Menhaden Fish Oil in ethanol. PVB and di-n butyl phthalate (DBP) were added and the slurry was ball-milled for an additional 24 hours. The NiO—GDC slurry was coated onto the Ni—YSZ ASL using a spin coating method and the samples were heat-treated at 900° C. for 1 hour.

Anode Functional Layer (AFL)

A 1 M GDC precursor solution was prepared in ethanol using Cerium (III) nitrate and Gadolinium (III) nitrate. The precursor solution was coated onto the anode substrate by a roller coating or spray coating method, and heat-treated at 900° C. for 1 hour.

A Ni precursor solution, Nickel (II) nitrate in ethanol, was prepared, such that the GDC precursor solution and Ni precursor solution were of like concentration. The Ni and GDC precursor solutions were roller-coated or sprayed individually to yield a composite Ni—GDC AFL. The composite AFL was heat treated at 900° C. for 1 hour.

A multilayered AFL was prepared by roller-coating or spray-coating a pure GDC functional layer on the Ni—GDC composite AFL situated on a hot plate. After depositing the desired amount of GDC precursor, the sample was heat treated at 900° C. for 1 hour.

GDC Electrolyte

GDC powder was ball milled for 24 hours with Menhaden Fish Oil in ethanol. PVB and di-n butyl phthalate (DBP) were added after ball-milling and the slurry was ball-milled for another 24 hours. The GDC slurry was coated onto an anode surface by spin coating. The sample was sintered at 1450° C. for 4 hours using a 3° C./minute ramp rate in air.

LSCF-GDC Cathode

Cathode inks were prepared by mixing $La_{0.6}Sr_{0.4}Co_{0.2}Fe_{0.8}O_{3-\delta}$ powder (Praxair) and GDC powder (Rhodia), in a 50:50 weight % ratio, with the solvents α-terpiniol and ethanol, the plasticizer DBP, and the binder PVB using a mortar and pestle. After 30 minutes of mixing, the ink was brush-painted evenly onto the GDC electrolyte. After drying for 1 hour at 120° C., a second coat of cathode ink was applied. The cathode was baked at 1100~1200° C. for 1 hour.

Cell Characterization

Pt paste was brush-painted onto both electrodes, which were contacted with a Pt mesh and gold lead wires to form current collectors. Electrodes with current collectors were heat-treated at 900° C. for 1 hour.

Fuel cell samples were placed on a zirconia tube in a custom-made testing apparatus using a two-part ceramabond sealant (a mixture of 517-powder and 517-liquid from Aremco). Dry air, at 90 sccm, and wet hydrogen, at 90 sccm, were supplied to the cathode and anode side of the fuel cell, respectively. OCP and the current-voltage (I-V) measurements were carried out at various temperatures using a Solartron 1287 potentiostat.

Figure 2:
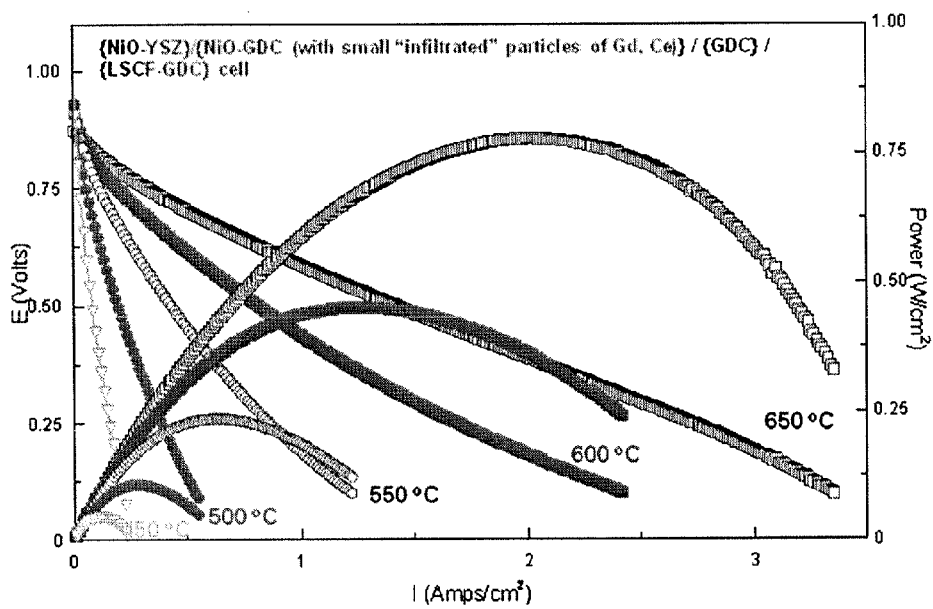
FIG. 2 is a plot of Open Circuit Voltage (left scale) and Power Density, (right scale) for a SOFC constructed with a Ni—GDC ASL at various temperatures.
Figure 3:
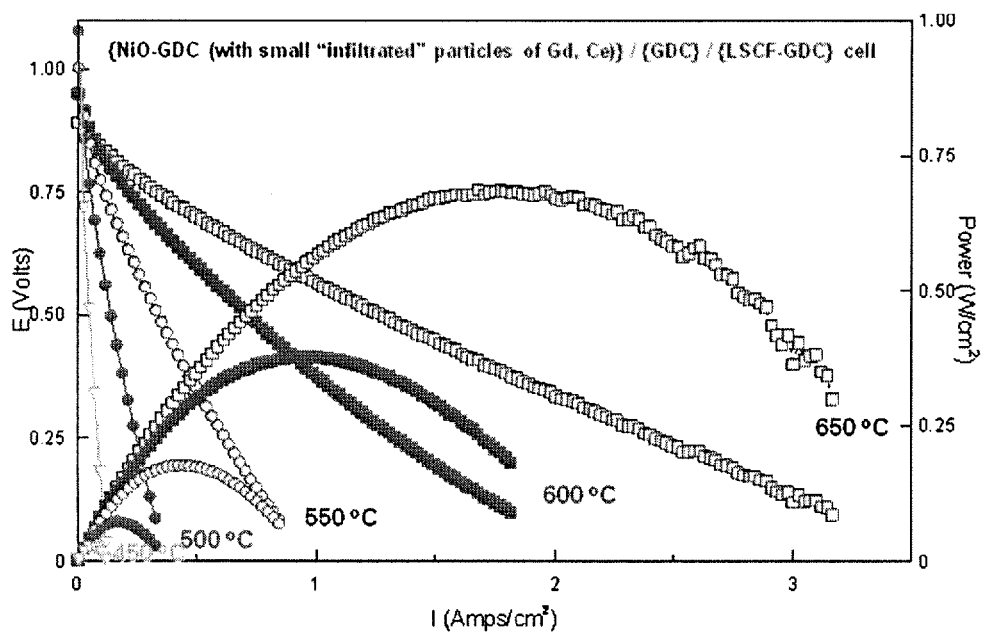
FIG. 3 is a plot of Open Circuit Voltage (left scale) and Power Density, (right scale) for a SOFC constructed with a Ni—YSZ ASL/Ni—GDC AFL composite anode, according to an embodiment of the invention at various temperatures.

At 650° C., an operation temperature for Intermediate Temperature SOFCs, cell with Ni—GDC and Ni—YSZ ASLs produced the same Open Circuit Voltage (OCV) of 0.89V, as shown in FIGS. 2 and 3, respectively. The maximum power density of the Ni—GDC ASL cell was about 680 mW/cm$^2$, and that of the NiO—YSZ ASL cell was about 780 mW/cm$^2$. The difference in maximum power density between the NiO—YSZ support cell and the NiO—GDC cell was due to the anode support thickness and porosity.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. A composite anode, comprising an anode support layer (ASL) comprising nickel-yttria-stabilized zirconia (Ni-YSZ) and an anode functional layer (AFL) comprising nickel-gadolinium-doped ceria (Ni-GDC) prepared by suspension deposition or lamination of a ball-milled slurry to the ASL, wherein the ASL and the AFL are in uniform intimate contact, and wherein the ASL is 250 to 440 μm in thickness and wherein the Ni-GDC AFL is 5 to 40 μm in thickness.

2. The composite anode of claim 1, further comprising a second AFL comprising gadolinium-doped ceria (GDC), wherein the Ni-GDC AFL resides between the ASL and the second AFL.

3. The composite anode of claim 2, wherein the second AFL is 5 to 30 μm in thickness.

4. A solid oxide fuel cell (SOFC), comprising:
 a composite anode according to claim 1 comprising a Ni-YSZ ASL and a Ni-GDC AFL; and
 an electrolyte layer comprising GDC, wherein the AFL resides between the ASL and the electrolyte layer, wherein the ASL and the AFL are in uniform intimate contact, and wherein the ASL is 250 to 440 μm in thickness and wherein the Ni-GDC AFL is 5 to 40 μm in thickness.

5. The SOFC of claim 4, further comprising a second AFL comprising GDC, wherein the second AFL resides between the Ni-GDC AFL and the electrolyte layer.

* * * * *